(12) United States Patent
Abotabl et al.

(10) Patent No.: US 11,917,556 B2
(45) Date of Patent: Feb. 27, 2024

(54) ENERGY HARVESTING BASED ON POWER HEADROOM

(71) Applicant: QUALCOMM Incorporated, San Diego, CA (US)

(72) Inventors: Ahmed Attia Abotabl, San Diego, CA (US); Ahmed Elshafie, San Diego, CA (US); Muhammad Sayed Khairy Abdelghaffar, San Jose, CA (US)

(73) Assignee: QUALCOMM Incorporated, San Diego, CA (US)

( * ) Notice: Subject to any disclaimer, the term of this patent is extended or adjusted under 35 U.S.C. 154(b) by 248 days.

(21) Appl. No.: 17/451,467

(22) Filed: Oct. 19, 2021

(65) Prior Publication Data

US 2023/0120756 A1   Apr. 20, 2023

(51) Int. Cl.
*H04W 52/20* (2009.01)
*H04W 52/36* (2009.01)

(52) U.S. Cl.
CPC .................................. *H04W 52/365* (2013.01)

(58) Field of Classification Search
CPC .... H04W 52/365; H04W 52/20; H04L 1/0026
See application file for complete search history.

(56) References Cited

U.S. PATENT DOCUMENTS

| | | | | |
|---|---|---|---|---|
| 8,694,047 B2* | 4/2014 | Yang | ..................... | H04W 52/40 |
| | | | | 370/252 |
| 8,774,074 B2* | 7/2014 | Choi | ................. | H04W 52/0222 |
| | | | | 370/311 |
| 9,048,787 B2* | 6/2015 | Jones | ..................... | H03F 3/245 |
| 9,077,405 B2* | 7/2015 | Jones | ..................... | H03F 1/0227 |
| 9,237,576 B2* | 1/2016 | Yang | ................. | H04W 72/0473 |
| 9,900,204 B2* | 2/2018 | Levesque | ................ | H03F 3/195 |
| 10,462,541 B2* | 10/2019 | Frackelton | ............... | H04Q 9/00 |
| 10,964,426 B2* | 3/2021 | Johnson | .................. | G16H 40/20 |
| 11,130,422 B1* | 9/2021 | Goldfarb | ................. | B63B 79/15 |
| 2012/0025752 A1* | 2/2012 | Teggatz | .................... | H02J 7/35 |
| | | | | 320/101 |

(Continued)

FOREIGN PATENT DOCUMENTS

CN   113473422 A   10/2021
KR   20190023411 A   3/2019
(Continued)

OTHER PUBLICATIONS

Dahlman E., et al., "5G NR the Next Generation Wireless Access Technology", 2nd Edition, Chapters 1-17 In: "5G NR", Sep. 18, 2020, Elsevier, XP055908004, 396 Pages, ISBN: 978-0-12-822320-8, section 9.11 section 9.11.1, section 14.2.4.

(Continued)

*Primary Examiner* — Hai V Nguyen
(74) *Attorney, Agent, or Firm* — Harrity & Harrity LLP

(57) ABSTRACT

Various aspects of the present disclosure generally relate to wireless communication. In some aspects, a user equipment (UE) may transmit a power headroom report (PHR) including data indicating power headroom (PH) for the UE, the PH indicating a difference between a maximum output power of the UE and an actual transmission power. The UE may adjust an energy harvesting reception process based at least in part on the PH satisfying a first threshold. Numerous other aspects are described.

30 Claims, 10 Drawing Sheets

(56) References Cited

U.S. PATENT DOCUMENTS

| | | | |
|---|---|---|---|
| 2013/0107780 A1* | 5/2013 | Choi | H04W 52/0216 370/311 |
| 2013/0111235 A1* | 5/2013 | Yang | H04W 52/243 713/310 |
| 2015/0282091 A1* | 10/2015 | Lin | H04W 24/02 455/574 |
| 2016/0188648 A1* | 6/2016 | Malcolm | G16H 10/60 707/746 |
| 2017/0109481 A1* | 4/2017 | Johnson | G16H 40/20 |
| 2018/0264347 A1* | 9/2018 | Tran | A63B 69/38 |
| 2018/0278489 A1* | 9/2018 | Frackelton | H04L 43/50 |
| 2020/0117690 A1* | 4/2020 | Tran | G06F 16/90332 |
| 2020/0376983 A1* | 12/2020 | Titus | H04W 4/40 |
| 2021/0013750 A1 | 1/2021 | Kronander et al. | |
| 2022/0023742 A1* | 1/2022 | Tran | H04N 23/60 |
| 2022/0046555 A1* | 2/2022 | Khoshnevisan | H04W 72/0453 |
| 2022/0060998 A1* | 2/2022 | Khoshnevisan | H04W 72/04 |
| 2022/0160309 A1* | 5/2022 | Poltorak | A61B 5/021 |
| 2022/0352751 A1* | 11/2022 | Elshafie | H02J 50/23 |
| 2023/0008030 A1* | 1/2023 | Yuan | H04W 52/242 |
| 2023/0098241 A1* | 3/2023 | Abotabl | H04W 52/0216 370/311 |
| 2023/0117363 A1* | 4/2023 | Abotabl | H02J 50/001 307/104 |
| 2023/0171711 A1* | 6/2023 | Abotabl | H04W 52/146 455/522 |
| 2023/0275457 A1* | 8/2023 | Abotabl | H02J 50/001 307/104 |

FOREIGN PATENT DOCUMENTS

| | | | | |
|---|---|---|---|---|
| WO | WO-2022046324 A1 * | 3/2022 | | H04W 52/06 |
| WO | WO-2022151307 A1 * | 7/2022 | | |
| WO | WO-2023166022 A1 * | 9/2023 | | |

OTHER PUBLICATIONS

International Search Report and Written Opinion—PCT/US2022/078009—ISA/EPO—dated Jan. 30, 2023.

* cited by examiner

ENERGY HARVESTING BASED ON POWER HEADROOM

FIELD OF THE DISCLOSURE

Aspects of the present disclosure generally relate to wireless communication and to techniques and apparatuses for energy harvesting based on power headroom.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more base stations that support communication for a user equipment (UE) or multiple UEs. A UE may communicate with a base station via downlink communications and uplink communications. "Downlink" (or "DL") refers to a communication link from the base station to the UE, and "uplink" (or "UL") refers to a communication link from the UE to the base station.

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

Some aspects described herein relate to a method of wireless communication performed by a user equipment (UE). The method may include transmitting a power headroom report (PHR) including data indicating power headroom (PH) for the UE, the PH indicating a difference between a maximum output power of the UE and an actual transmission power. The method may include adjusting an energy harvesting reception process based at least in part on the PH satisfying a first threshold.

Some aspects described herein relate to a method of wireless communication performed by a UE. The method may include transmitting a PHR including data indicating PH for the UE, the PH indicating a difference between a maximum output power of the UE and an actual transmission power. The method may include adjusting an energy harvesting transmission process based at least in part on the PH satisfying a first threshold.

Some aspects described herein relate to a method of wireless communication performed by a base station. The method may include receiving a PHR including data indicating PH for a UE, the PH indicating a difference between a maximum output power of the UE and an actual transmission power. The method may include adjusting an energy harvesting transmission process based at least in part on the PH satisfying a first threshold.

Some aspects described herein relate to a UE for wireless communication. The user equipment may include a memory and one or more processors coupled to the memory. The one or more processors may be configured to transmit a PHR including data indicating PH for the UE, the PH indicating a difference between a maximum output power of the UE and an actual transmission power. The one or more processors may be configured to adjust an energy harvesting reception process based at least in part on the PH satisfying a first threshold.

Some aspects described herein relate to a UE for wireless communication. The UE may include a memory and one or more processors coupled to the memory. The one or more processors may be configured to transmit a PHR including data indicating PH for the UE, the PH indicating a difference between a maximum output power of the UE and an actual transmission power. The one or more processors may be configured to adjust an energy harvesting transmission process based at least in part on the PH satisfying a first threshold.

Some aspects described herein relate to a base station for wireless communication. The base station may include a memory and one or more processors coupled to the memory. The one or more processors may be configured to receive a PHR including data indicating PH for a UE, the PH indicating a difference between a maximum output power of the UE and an actual transmission power. The one or more processors may be configured to adjust an energy harvesting transmission process based at least in part on the PH satisfying a first threshold.

Some aspects described herein relate to a non-transitory computer-readable medium that stores a set of instructions for wireless communication by a UE. The set of instructions, when executed by one or more processors of the UE, may cause the UE to transmit a PHR including data indicating PH for the UE, the PH indicating a difference between a maximum output power of the UE and an actual transmission power. The set of instructions, when executed by one or more processors of the UE, may cause the UE to adjust an energy harvesting reception process based at least in part on the PH satisfying a first threshold.

Some aspects described herein relate to a non-transitory computer-readable medium that stores a set of instructions for wireless communication by a UE. The set of instructions, when executed by one or more processors of the UE, may cause the UE to transmit a PHR including data indicating PH for the UE, the PH indicating a difference between a maximum output power of the UE and an actual transmission power. The set of instructions, when executed by one or more processors of the UE, may cause the one or more processors of the UE to adjust an energy harvesting transmission process based at least in part on the PH satisfying a first threshold.

Some aspects described herein relate to a non-transitory computer-readable medium that stores a set of instructions for wireless communication by a base station. The set of instructions, when executed by one or more processors of the base station, may cause the base station to receive a PHR including data indicating PH for a UE, the PH indicating a difference between a maximum output power of the UE and an actual transmission power. The set of instructions, when executed by one or more processors of the base station, may cause the base station to adjust an energy harvesting transmission process based at least in part on the PH satisfying a first threshold.

Some aspects described herein relate to an apparatus for wireless communication. The apparatus may include means for transmitting a PHR including data indicating PH for a UE, the PH indicating a difference between a maximum output power of the UE and an actual transmission power. The apparatus may include means for adjusting an energy harvesting reception process based at least in part on the PH satisfying a first threshold.

Some aspects described herein relate to an apparatus for wireless communication. The apparatus may include means for transmitting a PHR including data indicating PH for a UE, the PH indicating a difference between a maximum output power of the UE and an actual transmission power. The apparatus may include means for adjusting an energy harvesting transmission process based at least in part on the PH satisfying a first threshold.

Some aspects described herein relate to an apparatus for wireless communication. The apparatus may include means for receiving a PHR including data indicating PH for a UE, the PH indicating a difference between a maximum output power of the UE and an actual transmission power. The apparatus may include means for adjusting an energy harvesting transmission process based at least in part on the PH satisfying a first threshold.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

Figure 1:
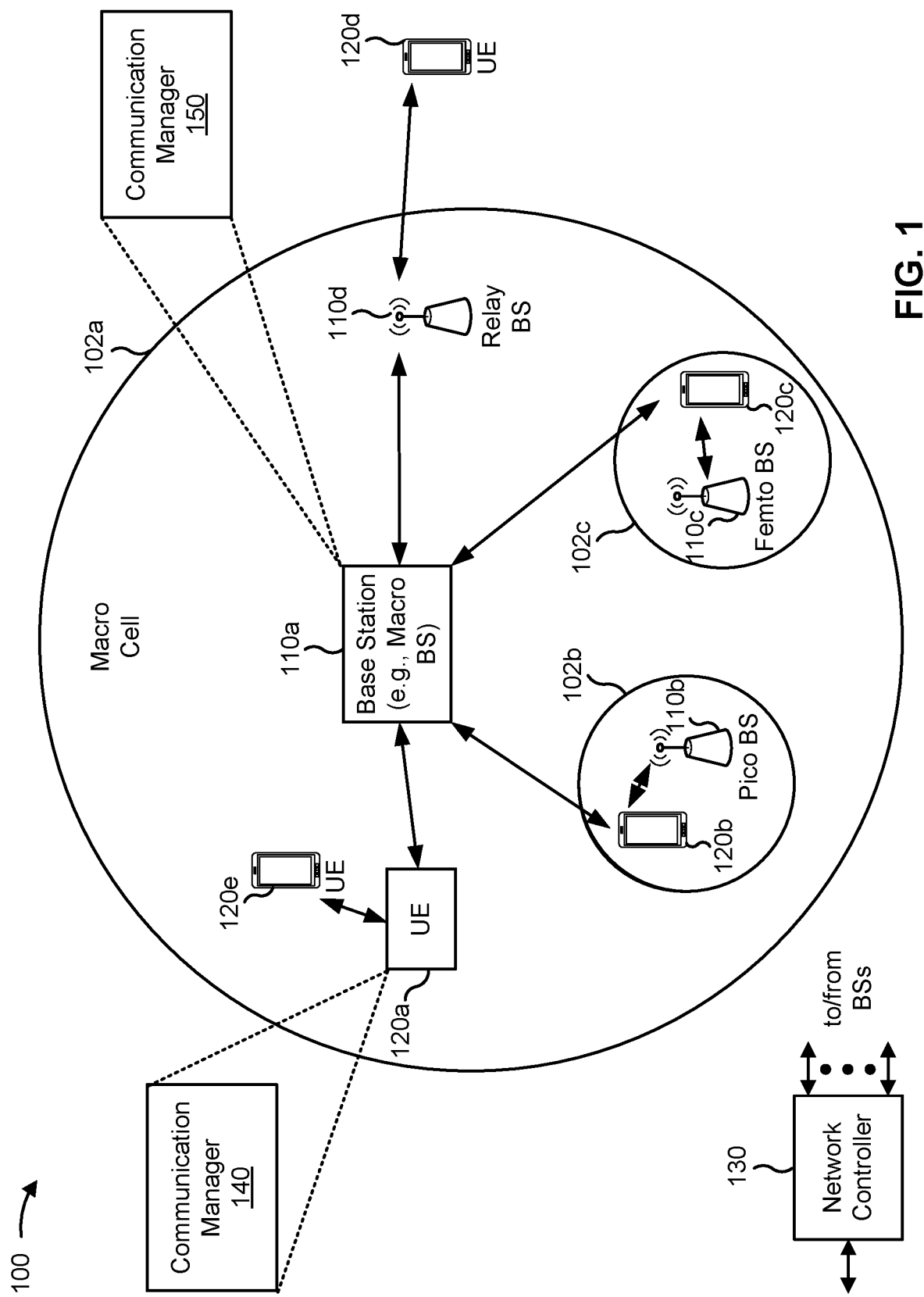
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more base stations 110 (shown as a BS 110a, a BS 110b, a BS 110c, and a BS 110d), a user equipment (UE) 120 or multiple UEs 120 (shown as a UE 120a, a UE 120b, a UE 120c, a UE 120d, and a UE 120e), and/or other network entities. A base station 110 is an entity that communicates with UEs 120. A base station 110 (sometimes referred to as a BS) may include, for example, an NR base station, an LTE base station, a Node B, an eNB (e.g., in 4G), a gNB (e.g., in 5G), an access point, and/or a transmission reception point (TRP). Each base station 110 may provide communication coverage for a particular geographic area. In the Third Generation Partnership Project (3GPP), the term "cell" can refer to a coverage area of a base station 110 and/or a base station subsystem serving this coverage area, depending on the context in which the term is used.

A base station 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscription. A femto cell may cover a relatively small geographic area (e.g., a home) and may allow restricted access by UEs 120 having association with the femto cell (e.g., UEs 120 in a closed subscriber group (CSG)). A base station 110 for a macro cell may be referred to as a macro base station. A base station 110 for a pico cell may be referred to as a pico base station. A base station 110 for a femto cell may be referred to as a femto base station or an in-home base station. In the example shown in FIG. 1, the BS 110a may be a macro base station for a macro cell 102a, the BS 110b may be a pico base station for a pico cell 102b, and the BS 110c may be a femto base station for a femto cell 102c. A base station may support one or multiple (e.g., three) cells.

In some examples, a cell may not necessarily be stationary, and the geographic area of the cell may move according to the location of a base station 110 that is mobile (e.g., a mobile base station). In some examples, the base stations 110 may be interconnected to one another and/or to one or more other base stations 110 or network nodes (not shown) in the wireless network 100 through various types of backhaul interfaces, such as a direct physical connection or a virtual network, using any suitable transport network.

The wireless network 100 may include one or more relay stations. A relay station is an entity that can receive a transmission of data from an upstream station (e.g., a base station 110 or a UE 120) and send a transmission of the data to a downstream station (e.g., a UE 120 or a base station 110). A relay station may be a UE 120 that can relay transmissions for other UEs 120. In the example shown in FIG. 1, the BS 110d (e.g., a relay base station) may communicate with the BS 110a (e.g., a macro base station) and the UE 120d in order to facilitate communication between the BS 110a and the UE 120d. A base station 110 that relays communications may be referred to as a relay station, a relay base station, a relay, or the like.

The wireless network 100 may be a heterogeneous network that includes base stations 110 of different types, such as macro base stations, pico base stations, femto base stations, relay base stations, or the like. These different types of base stations 110 may have different transmit power levels, different coverage areas, and/or different impacts on interference in the wireless network 100. For example, macro base stations may have a high transmit power level (e.g., 5 to 40 watts) whereas pico base stations, femto base stations, and relay base stations may have lower transmit power levels (e.g., 0.1 to 2 watts).

A network controller 130 may couple to or communicate with a set of base stations 110 and may provide coordination and control for these base stations 110. The network controller 130 may communicate with the base stations 110 via a backhaul communication link. The base stations 110 may communicate with one another directly or indirectly via a wireless or wireline backhaul communication link.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, and/or any other suitable device that is configured to communicate via a wireless medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a base station, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the base station 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, the UE 120 may include a communication manager 140. As described in more detail elsewhere herein, the communication manager 140 may transmit a PHR including data indicating PH for the UE, the PH indicating a difference between a maximum output power of the UE and an actual transmission power; and adjust an energy harvesting reception process based at least in part on the PH satisfying a first threshold. As also described in more detail elsewhere herein, the communication manager 140 may transmit a PHR including data indicating PH for the UE, the PH indicating a difference between a maximum output power of the UE and an actual transmission power; and adjust an energy harvesting transmission process based at least in part on the PH satisfying a first threshold. Additionally, or alternatively, the communication manager 140 may perform one or more other operations described herein.

In some aspects, the base station 110 may include a communication manager 150. As described in more detail elsewhere herein, the communication manager 150 may receive a PHR including data indicating PH for a UE, the PH indicating a difference between a maximum output power of the UE and an actual transmission power; and adjust an energy harvesting transmission process based at least in part on the PH satisfying a first threshold. Additionally, or alternatively, the communication manager 150 may perform one or more other operations described herein.

As indicated above, FIG. 1 is provided as an example. Other examples may differ from what is described with regard to FIG. 1.

Figure 2:
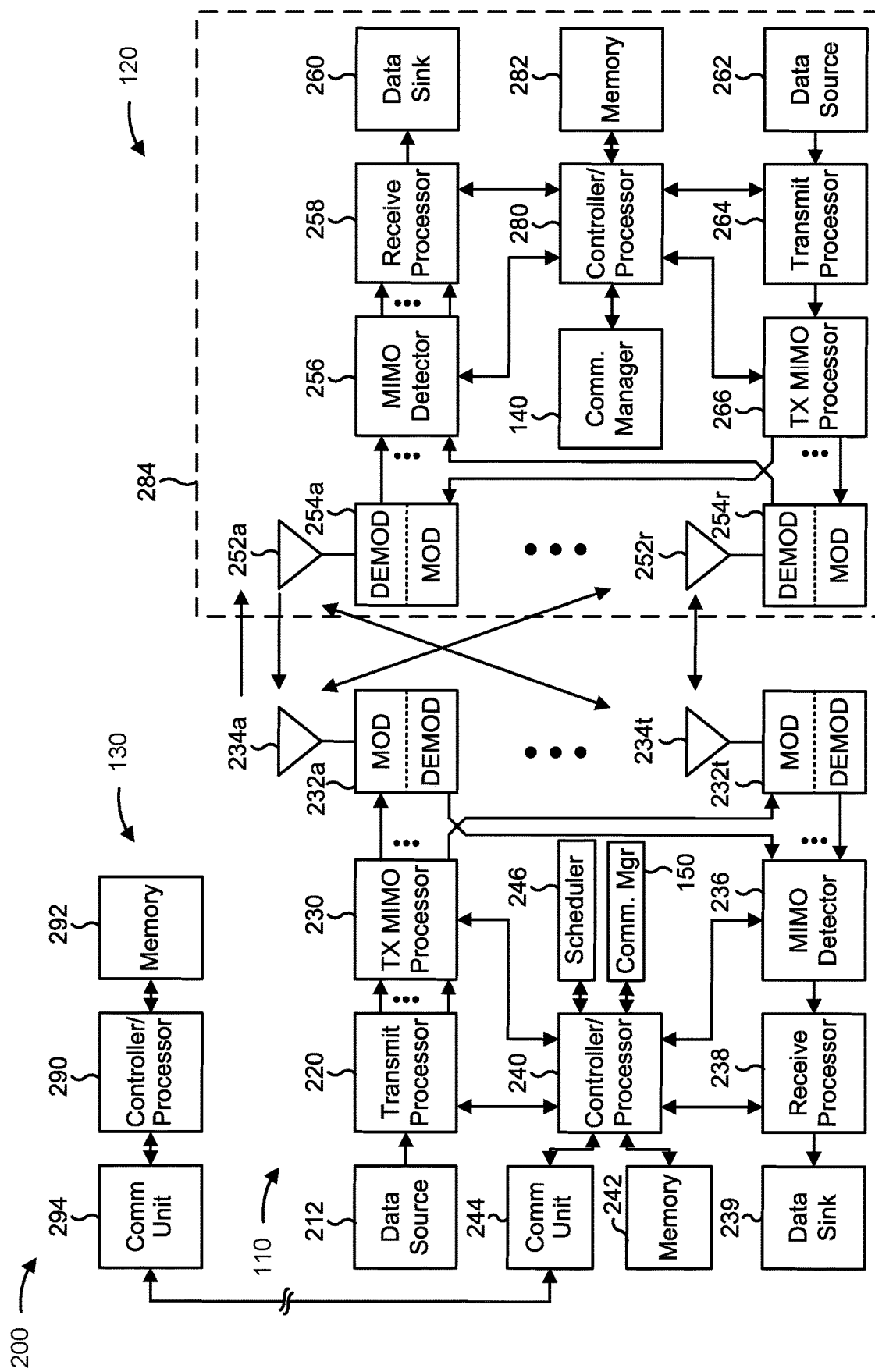
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. The base station 110 may be equipped with a set of antennas 234a through 234t, such as T antennas (T≥1). The UE 120 may be equipped with a set of antennas 252a through 252r, such as R antennas (R≥1).

At the base station 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The base station 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232*a* through 232*t*. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232*a* through 232*t* may transmit a set of downlink signals (e.g., T downlink signals) via a corresponding set of antennas 234 (e.g., T antennas), shown as antennas 234*a* through 234*t*.

At the UE 120, a set of antennas 252 (shown as antennas 252*a* through 252*r*) may receive the downlink signals from the base station 110 and/or other base stations 110 and may provide a set of received signals (e.g., R received signals) to a set of modems 254 (e.g., R modems), shown as modems 254*a* through 254*r*. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the base station 110 via the communication unit 294.

One or more antennas (e.g., antennas 234*a* through 234*t* and/or antennas 252*a* through 252*r*) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the base station 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 5-10).

At the base station 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The base station 110 may include a communication unit 244 and may communicate with the network controller 130 via the communication unit 244. The base station 110 may include a scheduler 246 to schedule one or more UEs 120 for downlink and/or uplink communications. In some examples, the modem 232 of the base station 110 may include a modulator and a demodulator. In some examples, the base station 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 5-10).

The controller/processor 240 of the base station 110, the controller/processor 280 of the UE 120, and/or any other component(s) of FIG. 2 may perform one or more techniques associated with energy harvesting based on power headroom, as described in more detail elsewhere herein. For example, the controller/processor 240 of the base station 110, the controller/processor 280 of the UE 120, and/or any other component(s) of FIG. 2 may perform or direct operations of, for example, process 600 of FIG. 6, process 700 of FIG. 7, process 800 of FIG. 8, and/or other processes as described herein. The memory 242 and the memory 282 may store data and program codes for the base station 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 600 of FIG. 6, process 700 of FIG. 7, process 800 of FIG. 8, and/or other processes as described herein. In some examples, executing instructions may include running the instructions, converting the instructions, compiling the instructions, and/or interpreting the instructions, among other examples.

In some aspects, the UE includes means for transmitting a PHR including data indicating PH for the UE, the PH indicating a difference between a maximum output power of the UE and an actual transmission power; and/or means for adjusting an energy harvesting reception process based at least in part on the PH satisfying a first threshold. In some aspects, the UE includes means for adjusting an energy harvesting transmission process based at least in part on the PH satisfying a first threshold. The means for the UE to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, the base station includes means for receiving a PHR including data indicating PH for a UE, the PH indicating a difference between a maximum output power of the UE and an actual transmission power; and/or means for adjusting an energy harvesting transmission process based at least in part on the PH satisfying a first threshold. The means for the base station to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Figure 3:
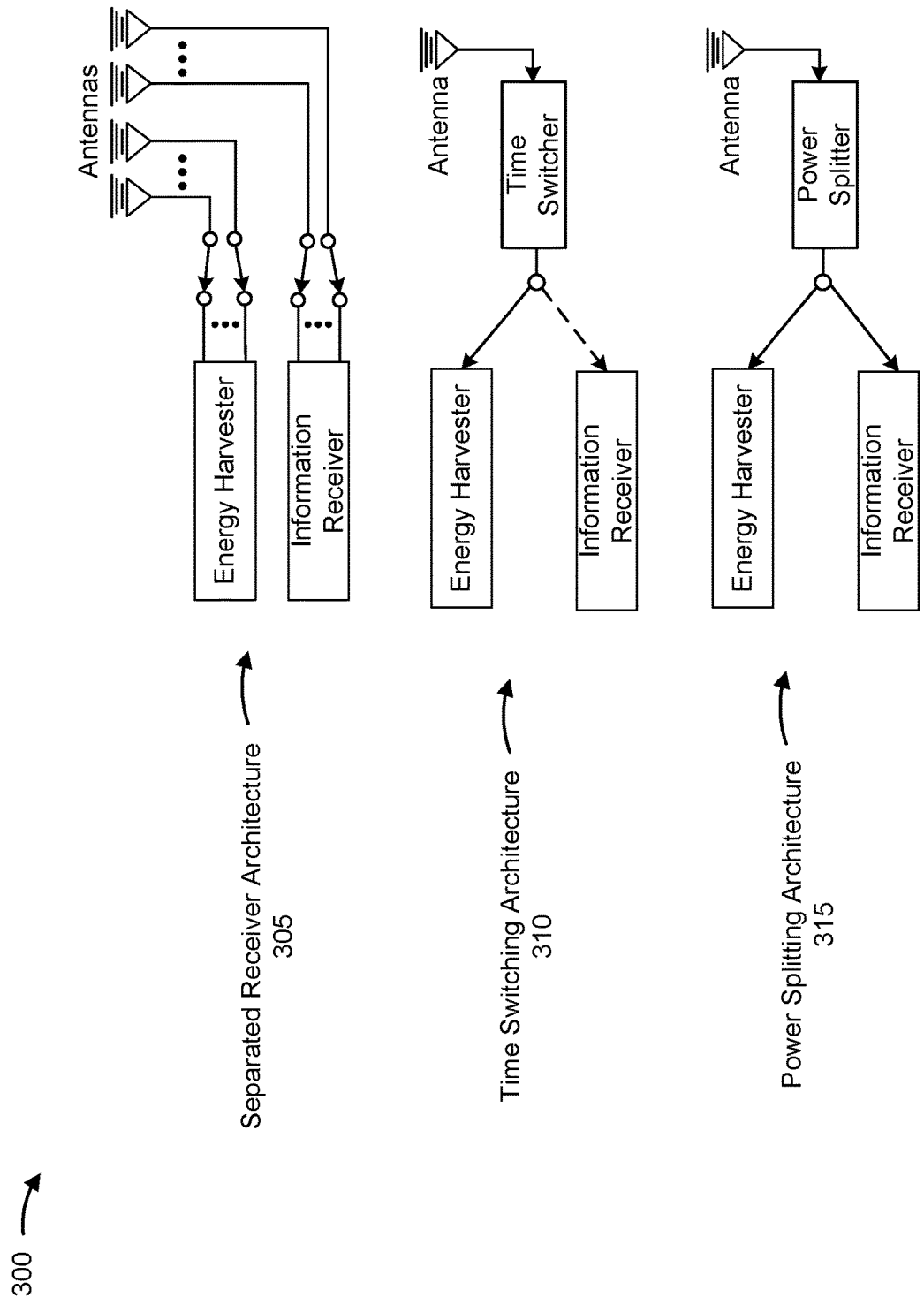
FIG. 3 is a diagram illustrating an example of radio frequency energy harvesting, in accordance with the present disclosure.

FIG. 3 is a diagram illustrating an example 300 of radio frequency (RF) power headroom reporting, in accordance with the present disclosure. As shown in FIG. 3, an RF receiver (e.g., a UE 120) may receive signals (e.g., radio signals carried on radio waves) from an RF transmitter (e.g., a base station 110 or UE 120) and convert electromagnetic energy of the signals (e.g., using a rectenna comprising a dipole antenna with an RF diode) into direct current electricity for use by the RF receiver.

As shown by reference number 305, in some aspects, the RF receiver may use a separated receiver architecture, where a first set of antennas is configured to harvest energy, and a second set of antennas is configured to receive data. In this situation, each set of antennas may be separately configured to receive signals at certain times, frequencies, and/or via one or more particular beams, such that all signals received by the first set of antennas are harvested for energy, and all signals received by the second set of antennas are processed to receive information.

As shown by reference number 310, in some aspects, the RF receiver may use a time-switching architecture to harvest energy. The time switching architecture may use one or more antennas to receive signals, and whether the signals are harvested for energy or processed to receive information depends on the time at which the signals are received. For example, one or more first time slots may be time slots during which received signals are sent to one or more energy harvesting components to harvest energy, and one or more second time slots may be time slots during which received signals are processed and decoded to receive information. In some aspects, the time slots may be pre-configured (e.g., by the RF receiver, the RF transmitter, or another device).

As shown by reference number 315, in some aspects, the RF receiver may use a power splitting architecture to harvest energy. The power splitting architecture may use one or more antennas to receive signals, and the signals are handled by one or both of the energy harvesting and/or information receiving components according to an energy harvesting rate. For example, the RF receiver may be configured to use a first portion of received signals for energy harvesting and the remaining received signals for information receiving. In some aspects, the energy harvesting rate may be pre-configured (e.g., by the RF receiver, the RF transmitter, or another device).

Energy harvested by the RF receiver may be used and/or stored for later use. For example, in some aspects, the RF receiver may be powered directly by the harvested energy. In some aspects, the RF receiver may use an energy storage device, such as a battery, capacitor, and/or supercapacitor, to gather and store harvested energy for immediate and/or later use.

As indicated above, FIG. 3 is provided as an example. Other examples may differ from what is described with respect to FIG. 3.

Figure 4:
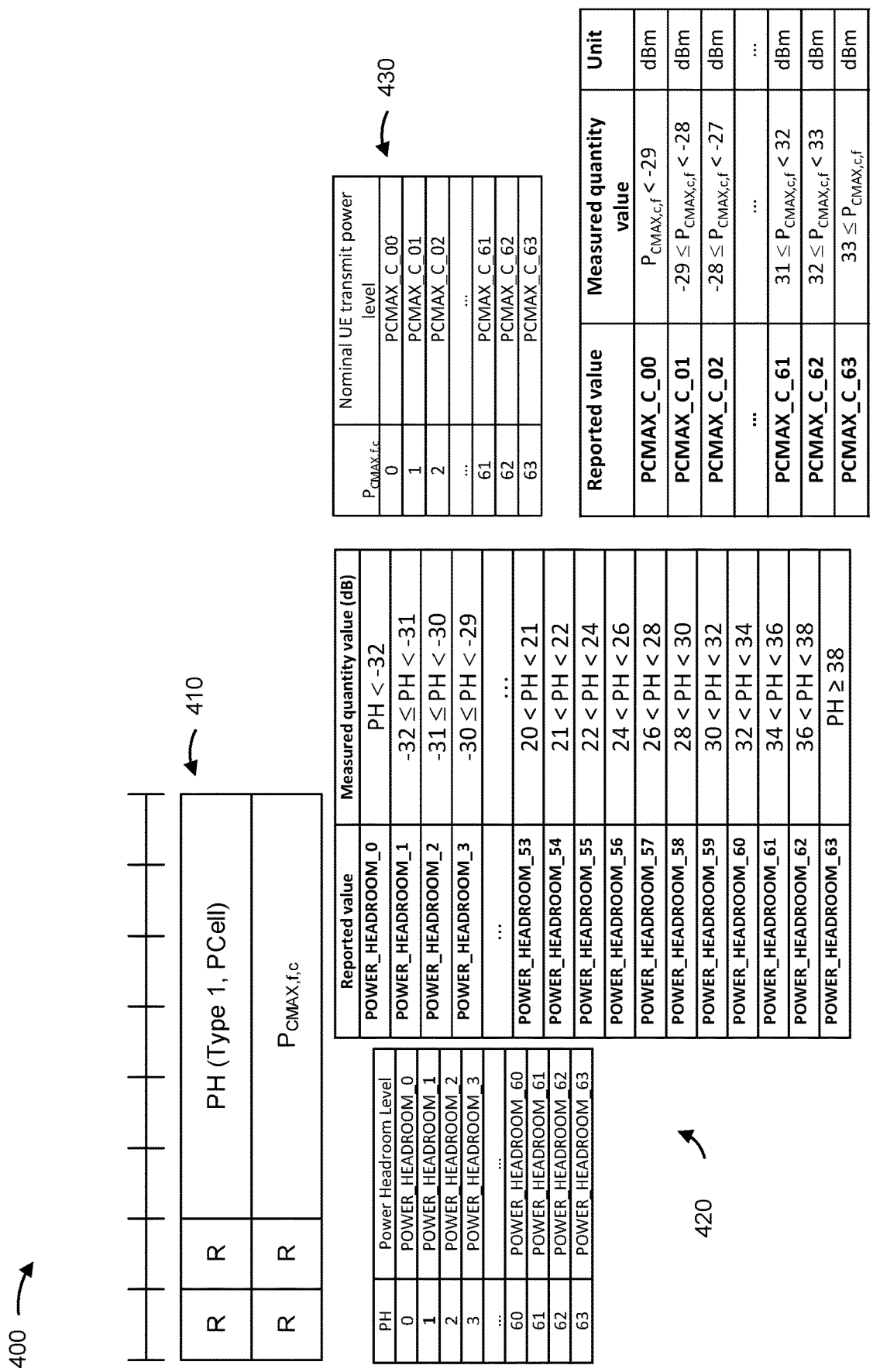
FIG. 4 is a diagram illustrating an example of power headroom reporting, in accordance with the present disclosure.

FIG. 4 is a diagram illustrating an example 400 of power headroom reporting, in accordance with the present disclosure. As shown in FIG. 4, a PHR 410 may be transmitted from a UE (e.g., UE 120) to a base station (e.g., base station 110). The PHR 410 is a UE generated report to the base station that provides the base station with an indication of how much power the UE has and/or is using.

The PH may indicate an amount of remaining transmission power available to a UE in addition to power being used by a current transmission. The PH may be based at least in part on a difference between a UE maximum transmission power and a physical uplink shared channel (PUSCH) transmission power. A PHR may be a Type 1 report for a PUSCH, a Type 3 report for a sounding reference signal (SRS), and/or a Type 2 report for a physical uplink control channel (PUCCH). For example, types of UE PHRs may include a Type 1 UE power headroom that is valid for a PUSCH transmission occasion i on an active uplink bandwidth part (BWP) b of carrier f of serving cell c, or a Type 3 UE power headroom that is valid for an SRS transmission occasion i on an active uplink BWP b of carrier f of serving cell c. Thus, a PHR may be determined for a component carrier and/or serving cell.

A UE may determine whether a PH for an activated serving cell is based at least in part on an actual transmission. The actual transmission may be determined based at least in part on higher layer signalling of configured grant and periodic/semi-persistent SRS transmissions, and/or downlink control information (DCI) received by the UE. The UE may determine whether the PHR for the activated serving cell is based at least in part on a reference format. The reference format may be determined based at least in part on higher layer signalling of configured grant and periodic/semi-persistent SRS transmissions, and/or DCI received by the UE. A PHR for an activated serving cell may be referred to as a virtual PHR and/or may be provided via a virtual PHR.

When a UE determines that a Type 1 PH for an activated serving cell is based at least in part on an actual PUSCH transmission, for a PUSCH transmission occasion i on an active uplink BWP b of carrier f of serving cell c, the UE may compute the Type 1 PH as:

$$PH_{type1,b,f,c}(i,j,q_d,l) = P_{CMAX,f,c}(i) - \{P_{O\_PUSCH,b,f,c}(j) + 10\log_{10}(2^\mu \cdot M_{RB,b,f,c}^{PUSCH}(i)) + \alpha_{b,f,c}(j) \cdot PL_{b,f,c}(q_d) + \Delta_{TF,b,f,c}(i) + f_{b,f,c}(i,l)\}.$$

With respect to the Type 1 PH (in dB) based at least in part on an actual PUSCH transmission, $P_{CMAX,f,c}(i)$ may represent a UE configured maximum output power after backoff due to power management (e.g., backoff due to a maximum power reduction), and $P_{O\_PUSCH,b,f,c}(j)$, $M_{RB,b,f,c}^{PUSCH}(i)$, $\alpha_{b,f,c}(q_d)$, $PL_{b,f,c}(q_d)$, $\Delta_{TF,b,f,c}(i)$ and $f_{b,f,c}(i,l)$ may be parameters used to determine a PUSCH transmit power.

When the UE determines that a Type 1 PH for an activated serving cell is based at least in part on a reference PUSCH transmission, for a PUSCH transmission occasion i on an active uplink BWP b of carrier f of serving cell c, the UE may compute the Type 1 PH as:

$$PH_{type1,b,f,c}(i,j,q_d,l) = \tilde{P}_{CMAX,f,c}(i) - \{P_{O\_PUSCH,b,f,c}(j) + \alpha_{b,f,c}(j) \cdot PL_{b,f,c}(q_d) + f_{b,f,c}(i,l)\} \quad [dB]$$

With respect to the Type 1 PH (in dB) based at least in part on a reference PUSCH transmission (e.g., a virtual power headroom report), $\tilde{P}_{CMAX,f,c}(i)$ may be computed assuming no backoff (e.g., maximum power reduction (MPR) values may be assumed to be 0 dB), and $P_{O\_PUSCH,b,f,c}(j)$, $\alpha_{b,f,c}(j)$, $PL_{b,f,c}(q_d)$, and $f_{b,f,c}(i, l)$ may be based at least in part on default or reference parameters of j, i, l, and $q_d$, where for P0 and alpha, p0-PUSCH-AlphaSetId is equal to 0, and for path loss, pusch-PathlossReferenceRS-Id is equal to 0, and for closedloopindex, l is equal to 0.

A PHR may be triggered by a media access control (MAC) layer, and the PHR may be triggered based at least in part on an occurrence of one or more triggering events. For example, the PHR may be triggered by a set of timers, such as a phr-PeriodicTimer or a phr-ProhibitTimer. The PHR may be triggered by a power change that satisfies a configurable threshold for a pathloss reference signal used for power control in an uplink component carrier. The PHR may be triggered by an activation of a secondary cell (SCell). The PHR may be triggered when an active BWP of a configured component carrier is changed from a dormant state to a non-dormant state.

A triggered PHR may be transmitted in a PHR MAC control element (MAC-CE) on a first available PUSCH corresponding to an initial transmission of a transport block that can accommodate the PHR MAC-CE as a result of logical channel prioritization. The PUSCH may be dynamic (e.g., scheduled by DCI), or the PUSCH can be a configured-grant PUSCH.

A UE may be configured with multiple component carriers for a PUSCH transmission. The PHR MAC-CE may include a PHR for more than one component carrier when a multiplePHR parameter is enabled via radio resource control (RRC) signaling. Otherwise, the PHR may be a report for a primary cell (PCell) and a single-entry PHR MAC-CE format may be used. When a first PUSCH in a first component carrier carries the PHR MAC-CE, for a second component carrier, the PHR MAC-CE may include an actual PHR or a virtual PHR (based on a reference format). When a PUSCH transmission is performed on the second component carrier at a time of power headroom reporting (e.g., in a slot of the first PUSCH), and the PUSCH transmission on the second component carrier is scheduled by DCI that satisfies a timeline condition, the PHR MAC-CE may include the actual PHR. Otherwise, the MAC-CE may include the virtual PHR.

The PHR MAC-CE may be a single-entry PHR MAC-CE, as shown by reference number 410, or a multiple-entry PHR MAC-CE. The single-entry PHR MAC-CE may include a PH field, which may indicate a PH level for the PCell, and a $P_{CMAX,f,c}$ field, which may indicate the $P_{CMAX,f,c}$ used for calculating the preceding PH field. The multiple-entry PHR MAC-CE may include entries for the PCell and a plurality of SCells. For example, for the PCell or a given SCell, the multiple-entry PHR MAC-CE may include the corresponding PH field, the $P_{CMAX,f,c}$ field, a "V" value which may indicate whether a PH value in the PH field corresponds to a real transmission or a reference format, and a "P" value which may indicate whether power backoff is applied due to power management.

As shown by reference number 410, the PH value of the PHR occupies a set of 6 bits, which provides a range from 0 to 63. The 64 PH values of the PHR are mapped to actual PH values (e.g., in dB) using PH lookup tables 420. As also shown by reference number 410, the $P_{CMAX,f,c}$ value, which was used to calculate the PH value, also occupies a set of 6 bits and also provides a range from 0 to 63. The 64 $P_{CMAX,f,c}$ values are mapped to actual $P_{CMAX,f,c}$ values (e.g., in dBm) using $P_{CMAX,f,c}$ lookup tables 430. The 'R' fields of the PHR may be reserved and/or populated with 0s.

As indicated above, FIG. 4 is provided as an example. Other examples may differ from what is described with respect to FIG. 4.

In situations where energy harvesting is used, a UE may receive signals for energy harvesting on certain resources (e.g., time, frequency, and/or spatial resources) and at a certain power level that results in a particular charging rate. However, in situations where energy harvesting is not needed, or a different charging rate would be beneficial for the UE, fixed and/or periodic energy harvesting signals may be wasted and/or may not be at a rate appropriate for the UE's charging needs.

Some techniques and apparatuses described herein enable a UE to adjust energy harvesting reception, and a base station to adjust energy harvesting transmission, based at least in part on a PHR. For example, the UE may transmit, and the base station may receive, a PHR that indicates the PH of the UE. Based at least in part on the PH satisfying a threshold, the UE and/or the base station may adjust energy harvesting reception and/or transmission, respectively. As a result, the UE and base station are able to receive and transmit, respectively, signals that are based on the needs of the UE as indicated by the PHR. In addition, in a situation where the UE is charging another device (e.g., another UE), the PHR may indicate that the other device should receive energy from a source other than the UE (e.g., in a situation where the UE needs to conserve power). This may prevent unnecessarily wasted energy harvesting signals from being transmitted, which may reduce power consumed by the base station and free up networking resources at both the transmitter and the receiver. In addition, the base station may be able to account for device charging needs by adjusting which UEs provide power to other devices based on the PHR(s) associated with the UEs.

Figure 5:
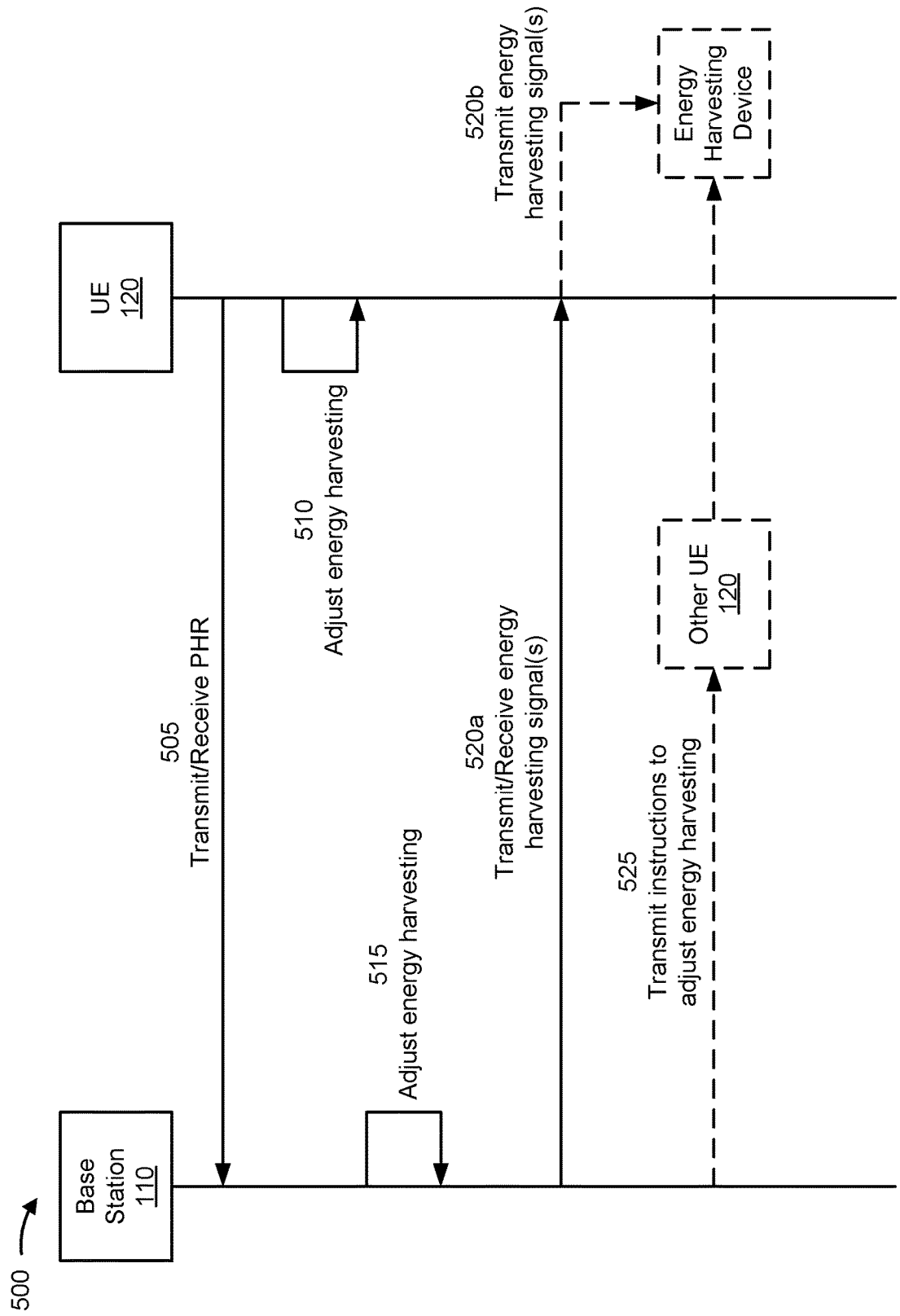
FIG. 5 is a diagram illustrating an example associated with energy harvesting based on power headroom, in accordance with the present disclosure.

FIG. 5 is a diagram illustrating an example 500 associated with energy harvesting based on power headroom, in accordance with the present disclosure. As shown in FIG. 5, a base station (e.g., base station 110) and a UE (e.g., UE 120) may communicate with one another. In addition, the base station may communicate with one or more other UEs (e.g., UEs 120), and both the UE and the other UE may communicate with an energy harvesting device (e.g., a UE 120).

As shown by reference number 505, the UE may transmit, and the base station may receive, a PHR. As described herein, the PHR may include data indicating PH for the UE, the PH indicating a difference between a maximum output power of the UE and an actual transmission power.

In some aspects, the PH may be used (e.g., by the UE and/or base station) to infer whether subsequent energy harvesting is to be performed (e.g., based on power needs of the UE). For example, a relatively low PH (e.g., below one or more pre-configured thresholds) may indicate that the UE is operating at or near its peak output power. In a situation where the UE is receiving energy harvesting signals from the base station (or another UE), a low PH may indicate that the UE should activate, continue, or increase reception of energy harvesting signals to offset the relatively high output power. In a situation where the UE is transmitting energy harvesting signals (e.g., to an energy harvesting device), the low PH may indicate that the UE should cancel transmission of energy harvesting signals in order to lower output power (e.g., to conserve battery). As another example, a relatively high PH (e.g., above one or more pre-configured thresholds) may indicate that the UE is operating with a significant amount of available power. In a situation where the UE is receiving energy harvesting signals, a high PH may indicate that the UE should cancel reception of the energy harvesting signals, as the UE may not need energy harvesting. In a situation where the UE is transmitting energy harvesting signals, a high PH may indicate that the UE should activate, increase, or continue transmission of the energy harvesting signals, as the UE may have energy available to transmit for use by another device.

As shown by reference number 510, the UE may adjust an energy harvesting reception and/or transmission process. In some aspects, the UE may adjust the energy harvesting reception and/or transmission process based at least in part on the PH satisfying a first threshold. For example, the UE may adjust the energy harvesting reception and/or transmission process by activating or canceling energy harvesting reception, increasing a charging rate, decreasing a charging rate, and/or the like.

In some aspects, the adjustments to the energy harvesting reception and/or transmission process may be pre-configured, such that the UE and/or base station may make the adjustments based on the PHR report and a pre-configured mapping of PH values and/or thresholds to energy harvesting adjustments. In some aspects, the adjustment of the energy harvesting reception process is based at least in part on both the energy harvesting signal transmitter and receiver. When a UE is to be a recipient of energy harvesting signals, the UE may cause the energy harvesting transmitter to activate or cancel transmission of energy harvesting signals and/or adjust energy harvesting transmission parameters (e.g., MCS) by transmitting the PHR or, in some aspects, transmitting a separate indication. When a UE is transmitting energy harvesting signals, the UE may cause the energy harvesting receiver to activate or cancel reception of energy harvesting signals and/or adjust energy harvesting reception parameters (e.g., cause the energy harvesting device to monitor or not monitor resources for energy harvesting signals) by transmitting an indication to the energy harvesting device.

In some aspects, the UE may adjust a charging rate associated with the energy harvesting reception and/or transmission process. For example, the UE may increase or decrease the charging rate by adjusting an amount of time the UE is to transmit or harvest energy from energy harvesting signals (e.g., in a time-switching architecture, as described herein) and/or adjusting a fraction of power allocated for energy harvesting (e.g., in a power-splitting architecture, as described herein). In some aspects, the charging rate may be associated with a percentage of signals being harvested, where data reception may be attempted on non-energy-harvested signals received by the UE. In some aspects, the charging rate may be increased and/or decreased by changing an MCS of the signals transmitted between the UE and the energy harvesting transmitter/receiver.

In some aspects, the first threshold is one of multiple thresholds, and the multiple thresholds may be associated with respective ranges of PH values. In this situation, adjusting the energy harvesting reception and/or transmission process may be based at least in part on the respective range of PH values associated with the threshold satisfied by the PH indicated in the PHR. For example, there may be up to 64 different thresholds configured for the 64 different PH values capable of being reported in the PHR. Each range of PH values may be associated with a different rate of charging. For example, when the UE is receiving energy harvesting signals, thresholds associated with higher PH values may be associated with lower charging rates, while thresholds associated with lower PH values may be associated with higher charging rates. When the UE is transmitting energy harvesting signals, thresholds associated with higher PH values may be associated with higher charging rates, while thresholds associated with lower PH values may be associated with lower charging rates. The rate at which the charging rate changes between ranges of PH values may be linear or non-linear, and any number of thresholds and PH value ranges may be used to determine adjustments to energy harvesting charging rates (e.g., signals using a lower MCS may provide more energy to be harvested than signals transmitted using a higher MCS).

In some aspects, adjusting the energy harvesting transmission and/or reception process may include continuing the energy harvesting transmission and/or reception process. For example, in a situation where conditions have not changed from transmission of a prior PHR, the energy harvesting transmitter and/or receiver may not need to make any changes to the energy harvesting transmission and/or reception, and may continue without making changes.

In some aspects, the UE may be configured with a time delay between transmitting the PHR and receiving energy harvesting signals. In this situation, the UE may determine to adjust the energy harvesting reception process for an energy harvesting occasion based at least in part on the time delay satisfying a time threshold. For example, the time delay between transmission of the PHR and reception of energy harvesting signals may be relatively short, and the UE may be configured to wait until the time threshold is met before adjusting reception parameters for energy harvesting reception (e.g., to give the energy harvesting transmitter time to adjust transmission parameters based at least in part on the PHR).

As shown by reference number 515, the base station may adjust an energy harvesting transmission process based at least in part on the PH satisfying a first threshold. For example, the base station may make any adjustments described herein as being performed by the UE as an energy harvesting transmitter, such as activating or deactivating transmission of energy harvesting signals, adjusting a charging rate associated with energy harvesting signals, and/or the like.

As shown by reference number 520a the base station may transmit, and the UE may receive, energy harvesting signals. As shown by reference number 520b, the UE may transmit energy harvesting signals to the energy harvesting device. As described herein, based at least in part on the adjustments to energy harvesting transmission and/or reception processes, the energy harvesting transmitter (e.g., the base station and/or the UE) may transmit the energy harvesting signals in accordance with the adjusted energy harvesting transmission/reception parameters.

As shown by reference number 525, in some aspects, the base station may transmit instructions to another UE to perform an energy harvesting process. For example, in a situation where the UE is no longer transmitting energy harvesting signals to the energy harvesting device, and the energy harvesting device is still in need of energy, the base station may instruct the other UE to provide energy harvesting signals for the energy harvesting device instead of the UE.

As indicated above, FIG. 5 is provided as an example. Other examples may differ from what is described with respect to FIG. 5.

Figure 6:
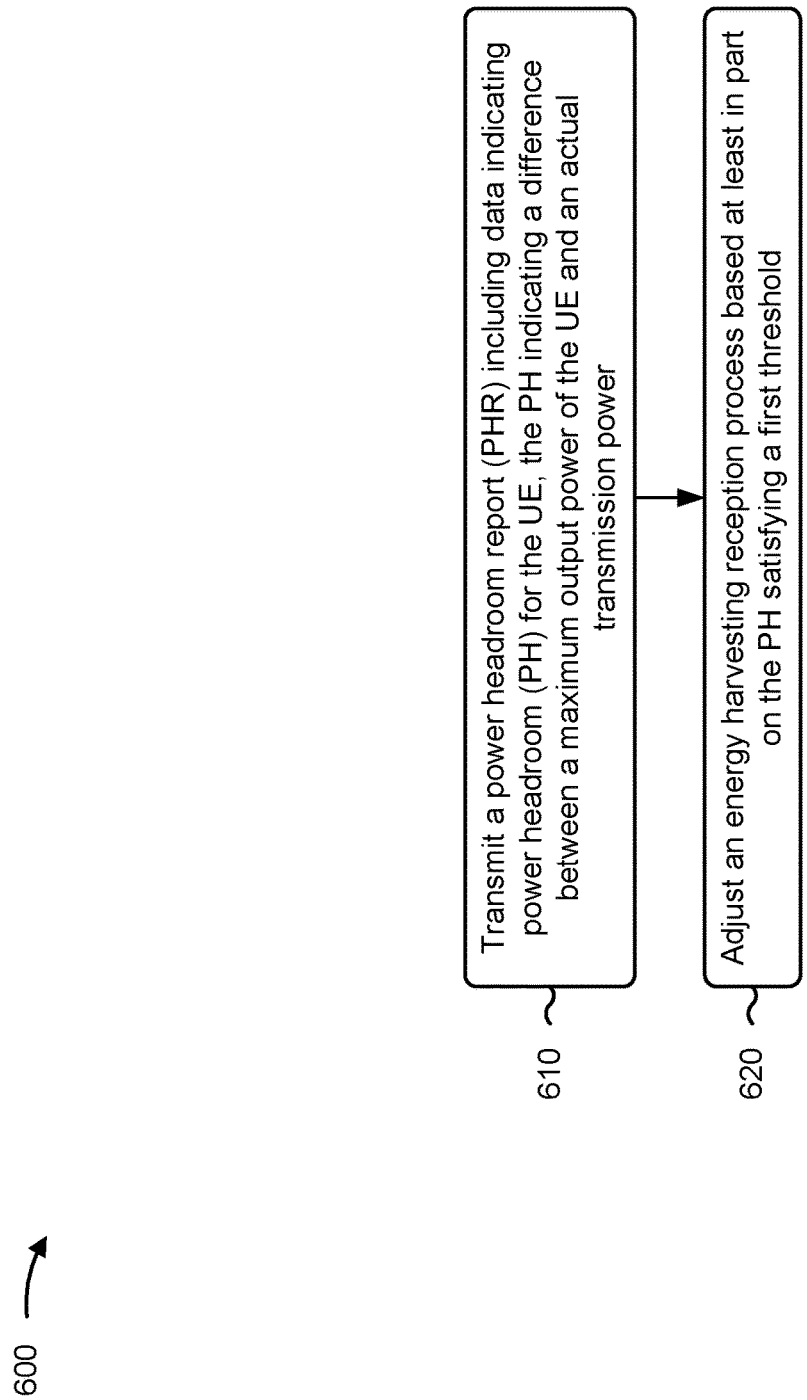
FIGS. 6-8 are diagrams illustrating example processes associated with energy harvesting based on power headroom, in accordance with the present disclosure.

FIG. 6 is a diagram illustrating an example process 600 performed, for example, by a UE, in accordance with the present disclosure. Example process 600 is an example where the UE (e.g., UE 120) performs operations associated with energy harvesting based on power headroom.

As shown in FIG. 6, in some aspects, process 600 may include transmitting a PHR including data indicating PH for the UE, the PH indicating a difference between a maximum output power of the UE and an actual transmission power (block 610). For example, the UE (e.g., using communication manager 140 and/or transmission component 904, depicted in FIG. 9) may transmit a PHR including data indicating PH for the UE, the PH indicating a difference between a maximum output power of the UE and an actual transmission power, as described above.

As further shown in FIG. 6, in some aspects, process 600 may include adjusting an energy harvesting reception process based at least in part on the PH satisfying a first threshold (block 620). For example, the UE (e.g., using communication manager 140 and/or energy harvesting component 908, depicted in FIG. 9) may adjust an energy harvesting reception process based at least in part on the PH satisfying a first threshold, as described above.

Process 600 may include additional aspects, such as any single aspect or any combination of aspects described below and/or in connection with one or more other processes described elsewhere herein.

In a first aspect, a time delay between the PHR and an energy harvesting occasion of the energy harvesting reception process satisfies a time threshold, and adjusting the energy harvesting reception process comprises canceling energy harvesting reception for the energy harvesting occasion based at least in part on the time delay satisfying the time threshold.

In a second aspect, alone or in combination with the first aspect, a time delay between the PHR and an energy harvesting occasion is within a pre-configured time window, and adjusting the energy harvesting reception process comprises canceling energy harvesting reception for the energy harvesting occasion based at least in part on the time delay being within the pre-configured time window.

In a third aspect, alone or in combination with one or more of the first and second aspects, a time delay between the PHR and an energy harvesting occasion is pre-configured.

In a fourth aspect, alone or in combination with one or more of the first through third aspects, adjusting the energy harvesting reception process comprises increasing a charging rate associated with the energy harvesting reception process.

In a fifth aspect, alone or in combination with one or more of the first through fourth aspects, adjusting the energy harvesting reception process comprises decreasing a charging rate associated with the energy harvesting reception process.

In a sixth aspect, alone or in combination with one or more of the first through fifth aspects, the first threshold is one of a plurality of thresholds, wherein each of the plurality of thresholds is associated with a respective range of PH values, and wherein adjusting the energy harvesting reception process comprises adjusting the energy harvesting reception process based on the respective range of PH values associated with the first threshold.

In a seventh aspect, alone or in combination with one or more of the first through sixth aspects, each of the respective ranges of PH values is associated with a different charging rate, and adjusting the energy harvesting reception process further comprises setting a charging rate associated with the energy harvesting reception process based at least in part on one of the respective ranges of PH values associated with the first threshold.

Although FIG. 6 shows example blocks of process 600, in some aspects, process 600 may include additional blocks, fewer blocks, different blocks, or differently arranged blocks than those depicted in FIG. 6. Additionally, or alternatively, two or more of the blocks of process 600 may be performed in parallel.

Figure 7:
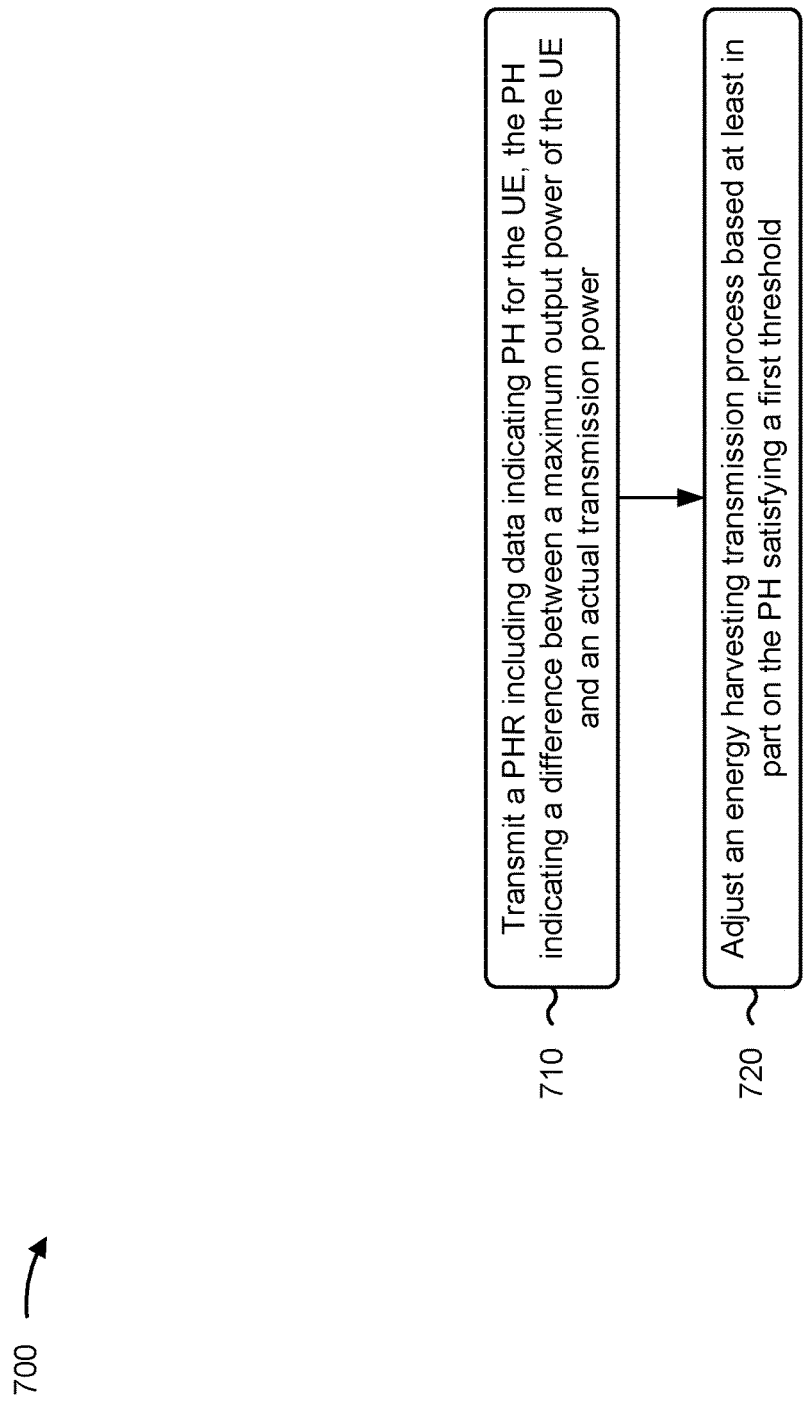

FIG. 7 is a diagram illustrating an example process 700 performed, for example, by a UE, in accordance with the present disclosure. Example process 700 is an example where the UE (e.g., UE 120) performs operations associated with energy harvesting based on power headroom.

As shown in FIG. 7, in some aspects, process 700 may include transmitting a PHR including data indicating PH for the UE, the PH indicating a difference between a maximum output power of the UE and an actual transmission power (block 710). For example, the UE (e.g., using communication manager 140 and/or transmission component 904, depicted in FIG. 9) may transmit a PHR including data indicating PH for the UE, the PH indicating a difference between a maximum output power of the UE and an actual transmission power, as described above.

As further shown in FIG. 7, in some aspects, process 700 may include adjusting an energy harvesting transmission process based at least in part on the PH satisfying a first threshold (block 720). For example, the UE (e.g., using communication manager 140 and/or energy harvesting component 908, depicted in FIG. 9) may adjust an energy harvesting transmission process based at least in part on the PH satisfying a first threshold, as described above.

Process 700 may include additional aspects, such as any single aspect or any combination of aspects described below and/or in connection with one or more other processes described elsewhere herein.

In a first aspect, process 700 includes adjusting the energy harvesting transmission process based at least in part on expiration of an energy harvesting timer.

In a second aspect, alone or in combination with the first aspect, adjusting the energy harvesting transmission process comprises canceling energy harvesting transmission based at least in part on the PH being below the first threshold.

In a third aspect, alone or in combination with one or more of the first and second aspects, adjusting the energy harvesting transmission process comprises activating energy harvesting transmission based at least in part on the PH being above the first threshold.

In a fourth aspect, alone or in combination with one or more of the first through third aspects, adjusting the energy harvesting transmission process comprises increasing a charging rate associated with the energy harvesting transmission process.

In a fifth aspect, alone or in combination with one or more of the first through fourth aspects, adjusting the energy harvesting transmission process comprises decreasing a charging rate associated with the energy harvesting transmission process.

In a sixth aspect, alone or in combination with one or more of the first through fifth aspects, the first threshold is one of a plurality of thresholds, wherein each of the plurality of thresholds is associated with a respective range of PH values, and wherein adjusting the energy harvesting transmission process comprises adjusting the energy harvesting transmission process based on the respective range of PH values associated with the first threshold.

In a seventh aspect, alone or in combination with one or more of the first through sixth aspects, each of the respective ranges of PH values is associated with a different charging rate, and adjusting the energy harvesting transmission process further comprises setting a charging rate associated with the energy harvesting transmission process based at least in part on one of the respective ranges of PH values associated with the first threshold.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

Figure 8:
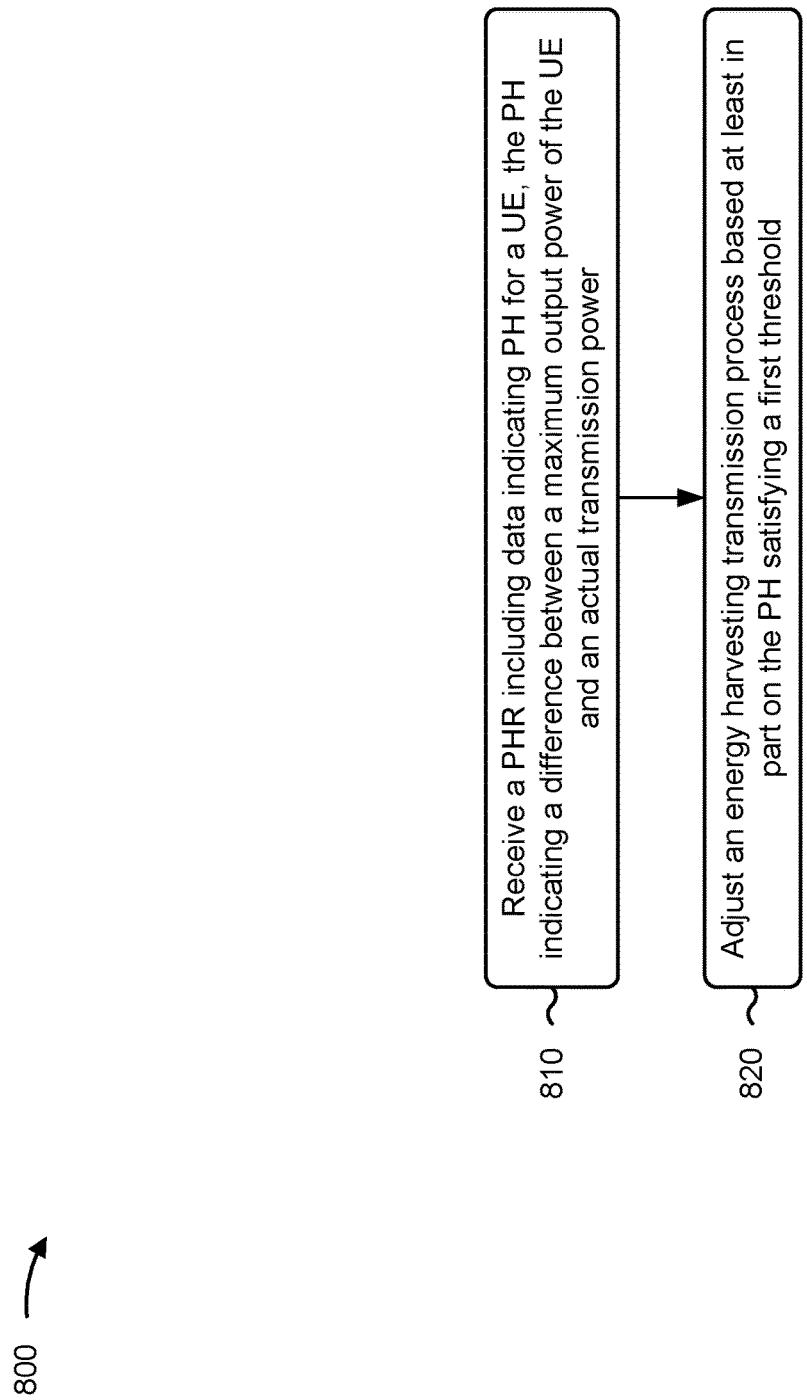

FIG. 8 is a diagram illustrating an example process 800 performed, for example, by a base station, in accordance with the present disclosure. Example process 800 is an example where the base station (e.g., base station 110) performs operations associated with energy harvesting based on power headroom.

As shown in FIG. 8, in some aspects, process 800 may include receiving a PHR including data indicating PH for a UE, the PH indicating a difference between a maximum output power of the UE and an actual transmission power (block 810). For example, the base station (e.g., using communication manager 150 and/or reception component 1002, depicted in FIG. 10) may receive a PHR including data indicating PH for a UE, the PH indicating a difference between a maximum output power of the UE and an actual transmission power, as described above.

As further shown in FIG. 8, in some aspects, process 800 may include adjusting an energy harvesting transmission process based at least in part on the PH satisfying a first threshold (block 820). For example, the base station (e.g., using communication manager 150 and/or energy harvesting component 1008, depicted in FIG. 10) may adjust an energy harvesting transmission process based at least in part on the PH satisfying a first threshold, as described above.

Process 800 may include additional aspects, such as any single aspect or any combination of aspects described below and/or in connection with one or more other processes described elsewhere herein.

In a first aspect, process 800 includes transmitting, to another UE, instructions to adjust energy harvesting associated with a target device.

In a second aspect, alone or in combination with the first aspect, adjusting the energy harvesting transmission process comprises canceling energy harvesting transmission based at least in part on the PH being above the first threshold.

In a third aspect, alone or in combination with one or more of the first and second aspects, adjusting the energy harvesting transmission process comprises activating energy harvesting transmission based at least in part on the PH being below the first threshold.

In a fourth aspect, alone or in combination with one or more of the first through third aspects, adjusting the energy harvesting transmission process comprises increasing a charging rate associated with the energy harvesting transmission process.

In a fifth aspect, alone or in combination with one or more of the first through fourth aspects, adjusting the energy harvesting transmission process comprises decreasing a charging rate associated with the energy harvesting transmission process.

In a sixth aspect, alone or in combination with one or more of the first through fifth aspects, the first threshold is one of a plurality of thresholds, wherein each of the plurality of thresholds is associated with a respective range of PH values, and wherein adjusting the energy harvesting transmission process comprises adjusting the energy harvesting transmission process based on the respective range of PH values associated with the first threshold.

In a seventh aspect, alone or in combination with one or more of the first through sixth aspects, each of the respective ranges of PH values is associated with a different charging rate, and adjusting the energy harvesting transmission process further comprises setting a charging rate associated with the energy harvesting transmission process based at least in part on one of the respective ranges of PH values associated with the first threshold.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

Figure 9:
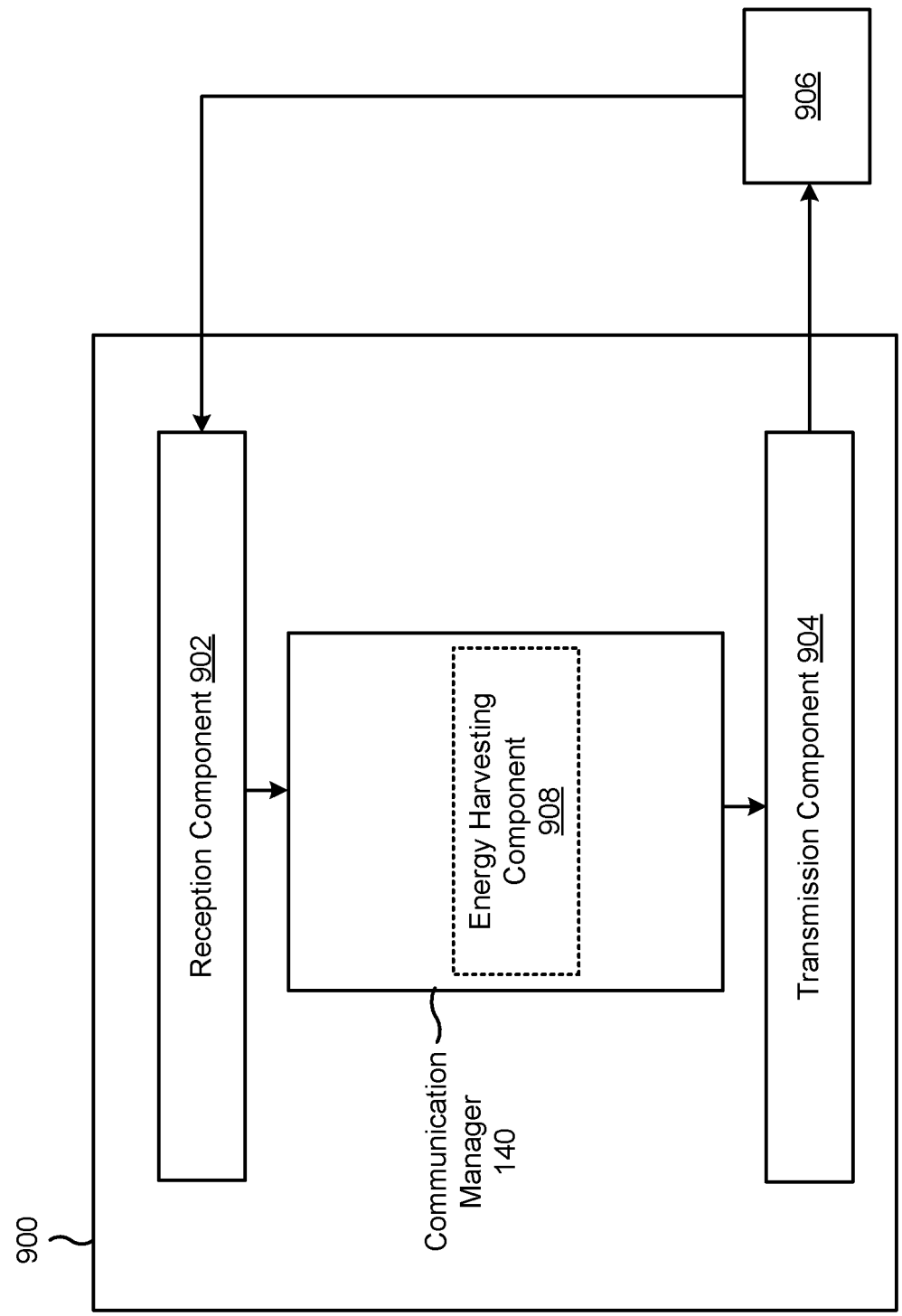
FIGS. 9 and 10 are diagrams of example apparatuses for wireless communication, in accordance with the present disclosure.

FIG. 9 is a diagram of an example apparatus 900 for wireless communication. The apparatus 900 may be a UE, or a UE may include the apparatus 900. In some aspects, the apparatus 900 includes a reception component 902 and a transmission component 904, which may be in communication with one another (for example, via one or more buses and/or one or more other components). As shown, the apparatus 900 may communicate with another apparatus 906 (such as a UE, a base station, or another wireless communication device) using the reception component 902 and the transmission component 904. As further shown, the apparatus 900 may include the communication manager 140. The communication manager 140 may include one or more of an energy harvesting component 908, among other examples.

In some aspects, the apparatus 900 may be configured to perform one or more operations described herein in connection with FIGS. 3-5. Additionally, or alternatively, the apparatus 900 may be configured to perform one or more processes described herein, such as process 600 of FIG. 6, process 700 of FIG. 7, or a combination thereof. In some aspects, the apparatus 900 and/or one or more components shown in FIG. 9 may include one or more components of the UE described in connection with FIG. 2. Additionally, or alternatively, one or more components shown in FIG. 9 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 902 may receive communications, such as reference signals, control information, data communications, or a combination thereof, from the apparatus 906. The reception component 902 may provide received communications to one or more other components of the apparatus 900. In some aspects, the reception component 902 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 900. In some aspects, the reception component 902 may include one or more antennas, a modem, a demodulator, a MIMO detector, a receive processor, a controller/processor, a memory, or a combination thereof, of the UE described in connection with FIG. 2.

The transmission component 904 may transmit communications, such as reference signals, control information, data communications, or a combination thereof, to the apparatus 906. In some aspects, one or more other components of the apparatus 900 may generate communications and may provide the generated communications to the transmission component 904 for transmission to the apparatus 906. In some aspects, the transmission component 904 may perform signal processing on the generated communications (such as filtering, amplification, modulation, digital-to-analog conversion, multiplexing, interleaving, mapping, or encoding, among other examples), and may transmit the processed signals to the apparatus 906. In some aspects, the transmission component 904 may include one or more antennas, a modem, a modulator, a transmit MIMO processor, a transmit processor, a controller/processor, a memory, or a combination thereof, of the UE described in connection with FIG. 2. In some aspects, the transmission component 904 may be co-located with the reception component 902 in a transceiver.

The transmission component 904 may transmit a PHR including data indicating PH for the UE, the PH indicating a difference between a maximum output power of the UE and an actual transmission power. The energy harvesting component 908 may adjust an energy harvesting reception process based at least in part on the PH satisfying a first threshold.

The number and arrangement of components shown in FIG. 9 are provided as an example. In practice, there may be additional components, fewer components, different components, or differently arranged components than those shown in FIG. 9. Furthermore, two or more components shown in FIG. 9 may be implemented within a single component, or a single component shown in FIG. 9 may be implemented as multiple, distributed components. Additionally, or alternatively, a set of (one or more) components shown in FIG. 9 may perform one or more functions described as being performed by another set of components shown in FIG. 9.

Figure 10:
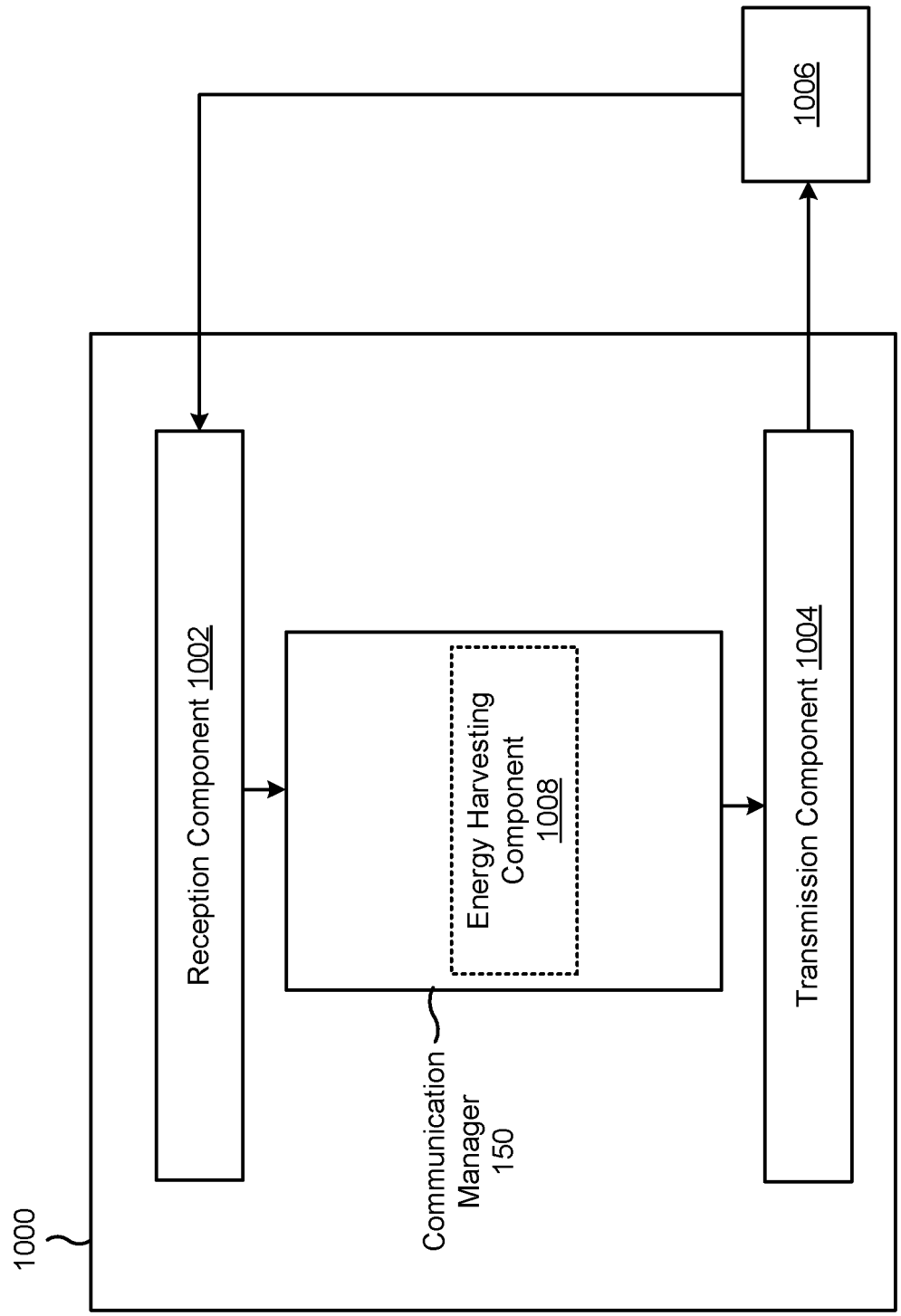

FIG. 10 is a diagram of an example apparatus 1000 for wireless communication. The apparatus 1000 may be a base station, or a base station may include the apparatus 1000. In some aspects, the apparatus 1000 includes a reception component 1002 and a transmission component 1004, which may be in communication with one another (for example, via one or more buses and/or one or more other components). As shown, the apparatus 1000 may communicate with another apparatus 1006 (such as a UE, a base station, or another wireless communication device) using the reception component 1002 and the transmission component 1004. As further shown, the apparatus 1000 may include the communication manager 150. The communication manager 150 may include an energy harvesting component 1008, among other examples.

In some aspects, the apparatus 1000 may be configured to perform one or more operations described herein in connection with FIGS. 3-5. Additionally, or alternatively, the apparatus 1000 may be configured to perform one or more processes described herein, such as process 800 of FIG. 8. In some aspects, the apparatus 1000 and/or one or more components shown in FIG. 10 may include one or more components of the base station described in connection with FIG. 2. Additionally, or alternatively, one or more components shown in FIG. 10 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1002 may receive communications, such as reference signals, control information, data communications, or a combination thereof, from the apparatus 1006. The reception component 1002 may provide received communications to one or more other components of the apparatus 1000. In some aspects, the reception component 1002 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1000. In some aspects, the reception component 1002 may include one or more antennas, a modem, a demodulator, a MIMO detector, a receive processor, a controller/processor, a memory, or a combination thereof, of the base station described in connection with FIG. 2.

The transmission component 1004 may transmit communications, such as reference signals, control information, data communications, or a combination thereof, to the apparatus 1006. In some aspects, one or more other components of the apparatus 1000 may generate communications and may provide the generated communications to the transmission component 1004 for transmission to the apparatus 1006. In some aspects, the transmission component 1004 may perform signal processing on the generated communications (such as filtering, amplification, modulation, digital-to-analog conversion, multiplexing, interleaving, mapping, or encoding, among other examples), and may transmit the processed signals to the apparatus 1006. In some aspects, the transmission component 1004 may include one or more antennas, a modem, a modulator, a transmit MIMO processor, a transmit processor, a controller/processor, a memory, or a combination thereof, of the base station described in connection with FIG. 2. In some aspects, the transmission component 1004 may be co-located with the reception component 1002 in a transceiver.

The reception component 1002 may receive a PHR including data indicating PH for a UE, the PH indicating a difference between a maximum output power of the UE and an actual transmission power. The energy harvesting component 1008 may adjust an energy harvesting transmission process based at least in part on the PH satisfying a first threshold.

The transmission component 1004 may transmit, to another UE, instructions to adjust energy harvesting associated with a target device.

The number and arrangement of components shown in FIG. 10 are provided as an example. In practice, there may be additional components, fewer components, different components, or differently arranged components than those shown in FIG. 10. Furthermore, two or more components shown in FIG. 10 may be implemented within a single component, or a single component shown in FIG. 10 may be implemented as multiple, distributed components. Additionally, or alternatively, a set of (one or more) components shown in FIG. 10 may perform one or more functions described as being performed by another set of components shown in FIG. 10.

The following provides an overview of some Aspects of the present disclosure:

Aspect 1: A method of wireless communication performed by a UE, comprising: transmitting a PHR including data indicating PH for the UE, the PH indicating a difference between a maximum output power of the UE and an actual transmission power; and adjusting an energy harvesting reception process based at least in part on the PH satisfying a first threshold.

Aspect 2: The method of Aspect 1, wherein a time delay between the PHR and an energy harvesting occasion of the energy harvesting reception process satisfies a time threshold; and wherein adjusting the energy harvesting reception process comprises canceling energy harvesting reception for the energy harvesting occasion based at least in part on the time delay satisfying the time threshold.

Aspect 3: The method of any of Aspects 1-2, wherein a time delay between the PHR and an energy harvesting occasion is within a pre-configured time window; and wherein adjusting the energy harvesting reception process comprises canceling energy harvesting reception for the energy harvesting occasion based at least in part on the time delay being within the pre-configured time window.

Aspect 4: The method of any of Aspects 1-3, wherein a time delay between the PHR and an energy harvesting occasion is pre-configured.

Aspect 5: The method of any of Aspects 1-4, wherein adjusting the energy harvesting reception process comprises increasing a charging rate associated with the energy harvesting reception process.

Aspect 6: The method of any of Aspects 1-5, wherein adjusting the energy harvesting reception process comprises decreasing a charging rate associated with the energy harvesting reception process.

Aspect 7: The method of any of Aspects 1-6, wherein the first threshold is one of a plurality of thresholds, wherein each of the plurality of thresholds is associated with a respective range of PH values, and wherein adjusting the energy harvesting reception process comprises: adjusting the energy harvesting reception process based on the respective range of PH values associated with the first threshold.

Aspect 8: The method of Aspect 7, wherein each of the respective ranges of PH values is associated with a different charging rate; and wherein adjusting the energy harvesting reception process further comprises: setting a charging rate associated with the energy harvesting reception process based at least in part on one of the respective ranges of PH values associated with the first threshold.

Aspect 9: A method of wireless communication performed by a UE, comprising: transmitting a PHR including data indicating PH for the UE, the PH indicating a difference between a maximum output power of the UE and an actual transmission power; and adjusting an energy harvesting transmission process based at least in part on the PH satisfying a first threshold.

Aspect 10: The method of Aspect 9, further comprising: adjusting the energy harvesting transmission process based at least in part on expiration of an energy harvesting timer.

Aspect 11: The method of any of Aspects 9-10, wherein adjusting the energy harvesting transmission process comprises canceling energy harvesting transmission based at least in part on the PH being below the first threshold.

Aspect 12: The method of any of Aspects 9-11, wherein adjusting the energy harvesting transmission process comprises activating energy harvesting transmission based at least in part on the PH being above the first threshold.

Aspect 13: The method of any of Aspects 9-12, wherein adjusting the energy harvesting transmission process comprises increasing a charging rate associated with the energy harvesting transmission process.

Aspect 14: The method of any of Aspects 9-13, wherein adjusting the energy harvesting transmission process comprises decreasing a charging rate associated with the energy harvesting transmission process.

Aspect 15: The method of any of Aspects 9-14, wherein the first threshold is one of a plurality of thresholds, wherein each of the plurality of thresholds is associated with a respective range of PH values, and wherein adjusting the energy harvesting transmission process comprises: adjusting the energy harvesting transmission process based on the respective range of PH values associated with the first threshold.

Aspect 16: The method of Aspect 15, wherein each of the respective ranges of PH values is associated with a different charging rate; and wherein adjusting the energy harvesting transmission process further comprises: setting a charging rate associated with the energy harvesting transmission process based at least in part on one of the respective ranges of PH values associated with the first threshold.

Aspect 17: A method of wireless communication performed by a base station, comprising: receiving a PHR including data indicating PH for a UE, the PH indicating a difference between a maximum output power of the UE and an actual transmission power; and adjusting an energy harvesting transmission process based at least in part on the PH satisfying a first threshold.

Aspect 18: The method of Aspect 17, further comprising: transmitting, to another UE, instructions to adjust energy harvesting associated with a target device.

Aspect 19: The method of any of Aspects 17-18, wherein adjusting the energy harvesting transmission process comprises canceling energy harvesting transmission based at least in part on the PH being above the first threshold.

Aspect 20: The method of any of Aspects 17-19, wherein adjusting the energy harvesting transmission process comprises activating energy harvesting transmission based at least in part on the PH being below the first threshold.

Aspect 21: The method of any of Aspects 17-20, wherein adjusting the energy harvesting transmission process comprises increasing a charging rate associated with the energy harvesting transmission process.

Aspect 22: The method of any of Aspects 17-21, wherein adjusting the energy harvesting transmission process comprises decreasing a charging rate associated with the energy harvesting transmission process.

Aspect 23: The method of any of Aspects 17-22, wherein the first threshold is one of a plurality of thresholds, wherein each of the plurality of thresholds is associated with a respective range of PH values, and wherein adjusting the energy harvesting transmission process comprises: adjusting the energy harvesting transmission process based on the respective range of PH values associated with the first threshold.

Aspect 24: The method of Aspect 23, wherein each of the respective ranges of PH values is associated with a different charging rate; and wherein adjusting the energy harvesting transmission process further comprises: setting a charging rate associated with the energy harvesting transmission process based at least in part on one of the respective ranges of PH values associated with the first threshold.

Aspect 25: An apparatus for wireless communication at a device, comprising a processor; memory coupled with the processor; and instructions stored in the memory and executable by the processor to cause the apparatus to perform the method of one or more of Aspects 1-8.

Aspect 26: An apparatus for wireless communication at a device, comprising a processor; memory coupled with the processor; and instructions stored in the memory and executable by the processor to cause the apparatus to perform the method of one or more of Aspects 9-16.

Aspect 27: An apparatus for wireless communication at a device, comprising a processor; memory coupled with the processor; and instructions stored in the memory and executable by the processor to cause the apparatus to perform the method of one or more of Aspects 17-24.

Aspect 28: A device for wireless communication, comprising a memory and one or more processors coupled to the memory, the one or more processors configured to perform the method of one or more of Aspects 1-8.

Aspect 26: A device for wireless communication, comprising a memory and one or more processors coupled to the memory, the one or more processors configured to perform the method of one or more of Aspects 9-16.

Aspect 29: A device for wireless communication, comprising a memory and one or more processors coupled to the memory, the one or more processors configured to perform the method of one or more of Aspects 17-24.

Aspect 30: An apparatus for wireless communication, comprising at least one means for performing the method of one or more of Aspects 1-8.

Aspect 31: An apparatus for wireless communication, comprising at least one means for performing the method of one or more of Aspects 9-16.

Aspect 32: An apparatus for wireless communication, comprising at least one means for performing the method of one or more of Aspects 17-24.

Aspect 33: A non-transitory computer-readable medium storing code for wireless communication, the code comprising instructions executable by a processor to perform the method of one or more of Aspects 1-8.

Aspect 34: A non-transitory computer-readable medium storing code for wireless communication, the code comprising instructions executable by a processor to perform the method of one or more of Aspects 9-16.

Aspect 35: A non-transitory computer-readable medium storing code for wireless communication, the code comprising instructions executable by a processor to perform the method of one or more of Aspects 17-24.

Aspect 36: A non-transitory computer-readable medium storing a set of instructions for wireless communication, the set of instructions comprising one or more instructions that, when executed by one or more processors of a device, cause the device to perform the method of one or more of Aspects 1-8.

Aspect 37: A non-transitory computer-readable medium storing a set of instructions for wireless communication, the set of instructions comprising one or more instructions that, when executed by one or more processors of a device, cause the device to perform the method of one or more of Aspects 9-16.

Aspect 38: A non-transitory computer-readable medium storing a set of instructions for wireless communication, the set of instructions comprising one or more instructions that, when executed by one or more processors of a device, cause the device to perform the method of one or more of Aspects 17-24.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A user equipment (UE) for wireless communication, comprising:
    a memory; and
    one or more processors, coupled to the memory, configured to:
        transmit a power headroom report (PHR) including data indicating power headroom (PH) for the UE, the PH indicating a difference between a maximum output power of the UE and an actual transmission power; and
        adjust an energy harvesting reception process based at least in part on the PH satisfying a first threshold.

2. The UE of claim 1, wherein a time delay between the PHR and an energy harvesting occasion of the energy harvesting reception process satisfies a time threshold; and
    wherein the one or more processors, to adjust the energy harvesting reception process, are configured to cancel energy harvesting reception for the energy harvesting occasion based at least in part on the time delay satisfying the time threshold.

3. The UE of claim 1, wherein a time delay between the PHR and an energy harvesting occasion is within a pre-configured time window; and
    wherein the one or more processors, to adjust the energy harvesting reception process, are configured to cancel energy harvesting reception for the energy harvesting occasion based at least in part on the time delay being within the pre-configured time window.

4. The UE of claim 1, wherein a time delay between the PHR and an energy harvesting occasion is pre-configured.

5. The UE of claim 1, wherein the one or more processors, to adjust the energy harvesting reception process, are configured to increase a charging rate associated with the energy harvesting reception process.

6. The UE of claim 1, wherein the one or more processors, to adjust the energy harvesting reception process, are configured to decrease a charging rate associated with the energy harvesting reception process.

7. The UE of claim 1, wherein the first threshold is one of a plurality of thresholds, wherein each of the plurality of thresholds is associated with a respective range of PH values, and wherein the one or more processors, to adjust the energy harvesting reception process, are configured to:
    adjust the energy harvesting reception process based on the respective range of PH values associated with the first threshold.

8. The UE of claim 7, wherein each of the respective ranges of PH values is associated with a different charging rate; and
    wherein the one or more processors, to adjust the energy harvesting reception process, are configured to:
        set a charging rate associated with the energy harvesting reception process based at least in part on one of the respective ranges of PH values associated with the first threshold.

9. A user equipment (UE) for wireless communication, comprising:
    a memory; and
    one or more processors, coupled to the memory, configured to:
        transmit a power headroom report (PHR) including data indicating power headroom (PH) for the UE, the PH indicating a difference between a maximum output power of the UE and an actual transmission power; and
        adjust an energy harvesting transmission process based at least in part on the PH satisfying a first threshold.

10. The UE of claim 9, wherein the one or more processors are further configured to:
    adjust the energy harvesting transmission process based at least in part on expiration of an energy harvesting timer.

11. The UE of claim 9, wherein the one or more processors, to adjust the energy harvesting transmission process, are configured to cancel energy harvesting transmission based at least in part on the PH being below the first threshold.

12. The UE of claim 9, wherein the one or more processors, to adjust the energy harvesting transmission process, are configured to activate energy harvesting transmission based at least in part on the PH being above the first threshold.

13. The UE of claim 9, wherein the one or more processors, to adjust the energy harvesting transmission process, are configured to increase a charging rate associated with the energy harvesting transmission process.

14. The UE of claim 9, wherein the one or more processors, to adjust the energy harvesting transmission process, are configured to decrease a charging rate associated with the energy harvesting transmission process.

15. The UE of claim 9, wherein the first threshold is one of a plurality of thresholds, wherein each of the plurality of thresholds is associated with a respective range of PH values, and wherein the one or more processors, to adjust the energy harvesting reception process, are configured to:
    adjust the energy harvesting transmission process based on the respective range of PH values associated with the first threshold.

16. The UE of claim 15, wherein each of the respective ranges of PH values is associated with a different charging rate; and
    wherein the one or more processors, to adjust the energy harvesting transmission process, are configured to:
        set a charging rate associated with the energy harvesting transmission process based at least in part on one of the respective ranges of PH values associated with the first threshold.

17. A base station for wireless communication, comprising:
   a memory; and
   one or more processors, coupled to the memory, configured to:
      receive a power headroom report (PHR) including data indicating power headroom (PH) for a user equipment (UE), the PH indicating a difference between a maximum output power of the UE and an actual transmission power; and
      adjust an energy harvesting transmission process based at least in part on the PH satisfying a first threshold.

18. The base station of claim 17, wherein the one or more processors are further configured to:
   transmit, to another UE, instructions to adjust energy harvesting associated with a target device.

19. The base station of claim 17, wherein the one or more processors, to adjust the energy harvesting transmission process, are configured to cancel energy harvesting transmission based at least in part on the PH being above the first threshold.

20. The base station of claim 17, wherein the one or more processors, to adjust the energy harvesting transmission process, are configured to activate energy harvesting transmission based at least in part on the PH being below the first threshold.

21. The base station of claim 17, wherein the one or more processors, to adjust the energy harvesting transmission process, are configured to increase a charging rate associated with the energy harvesting transmission process.

22. The base station of claim 17, wherein the one or more processors, to adjust the energy harvesting transmission process, are configured to decrease a charging rate associated with the energy harvesting transmission process.

23. The base station of claim 17, wherein the first threshold is one of a plurality of thresholds, wherein each of the plurality of thresholds is associated with a respective range of PH values, and wherein the one or more processors, to adjust the energy harvesting reception process, are configured to:
   adjust the energy harvesting transmission process based on the respective range of PH values associated with the first threshold.

24. The base station of claim 23, wherein each of the respective ranges of PH values is associated with a different charging rate; and
   wherein the one or more processors, to adjust the energy harvesting transmission process, are configured to:
      set a charging rate associated with the energy harvesting transmission process based at least in part on one of the respective ranges of PH values associated with the first threshold.

25. A method of wireless communication performed by a user equipment (UE), comprising:
   transmitting a power headroom report (PHR) including data indicating power headroom (PH) for the UE, the PH indicating a difference between a maximum output power of the UE and an actual transmission power; and
   adjusting an energy harvesting process based at least in part on the PH satisfying a first threshold.

26. The method of claim 25, wherein a time delay between the PHR and an energy harvesting occasion of the energy harvesting process satisfies a time threshold; and
   wherein adjusting the energy harvesting process comprises canceling energy harvesting for the energy harvesting occasion based at least in part on the time delay satisfying the time threshold.

27. The method of claim 25, wherein adjusting the energy harvesting process comprises increasing a charging rate associated with the energy harvesting process.

28. The method of claim 25, wherein adjusting the energy harvesting process comprises decreasing a charging rate associated with the energy harvesting process.

29. The method of claim 25, wherein the first threshold is one of a plurality of thresholds, wherein each of the plurality of thresholds is associated with a respective range of PH values, and wherein adjusting the energy harvesting process comprises:
   adjusting the energy harvesting process based on the respective range of PH values associated with the first threshold.

30. The method of claim 29, wherein each of the respective ranges of PH values is associated with a different charging rate; and
   wherein adjusting the energy harvesting process further comprises:
      setting a charging rate associated with the energy harvesting process based at least in part on one of the respective ranges of PH values associated with the first threshold.

* * * * *